Patented Aug. 8, 1933

1,921,586

UNITED STATES PATENT OFFICE 1,921,586

MANUFACTURE OF DYES CONTAINING CHROMIUM

Ernest Albert Sack, Neuilly-sur-Seine, France, assignor to Compagnie Nationale de Matières Colorantes & Manufactures de Produits Chimiques du Nord Reunies Etablissements Kuhlmann, Paris, France, a Corporation of France No Drawing. Application June 18, 1930, Serial No. 462,143, and in France November 13, 1929

15 Claims. (Cl. 260—12)

The literature regarding chromium compounds of azo dyes shows that there are numerous patents for processes of chroming dyes using for the purpose various types of chromium compounds such as the salts of chromium with mineral acids, the halides of chromium, the salts of chromium with fatty acids, chromium hydroxide, in the presence of alkalies, such as soda or potash sometimes with the addition of organic substances comprising hydroxyl groups, such as glycerine, tannin, phenols etc.

When chromium salts of mineral acids have been used it has above all been insisted that for a good carrying out of the reaction the mineral acid liberated in the course of the fixation of the chromium on the dye should be neutralized. It has however, never been appreciated, except perhaps in the formation of coppered compounds, that the mineral acid liberated or produced in the reaction was not only of a nature to favor the compounds or even that in many cases (a fact which could hardly be foreseen) an addition of mineral acid used from the commencement was capable of accelerating the reaction.

According to the present invention compounds of ortho-hydroxyazo dyes containing chromium (some of which would be difficult to obtain in a state of purity by previous processes) are prepared in a simple manner by treating these dyes with or without pressure with chromium salts of mineral acids in the presence or not of free sulphuric acid.

As the chromium salt chromium sulphate is particularly suitable the following are examples ilustrating the invention but without imposing limitation:

Example I 42.5 kg of the dye obtained by combining the diazo compound of 1 amino-2-hydroxy-naphthalene-4-sulphonic acid with 1-phenyl-3-methyl-5-pyrazolone is heated under pressure for 24 hours in a sealed autoclave at 120° C. with 400 kg of a solution of sulphate of chromium containing 47 kg of that salt of the formula $Cr_2(SO_4)_3.18H_2O$.

On cooling, the new compound separates out in the form of small red prisms with a bronze sheen. It will be noted that the liquid from which the crystals have formed has become strongly acid (mineral acidity). The dye as obtained is insoluble in cold water, slightly soluble in boiling water; its sodium salt which is easily soluble gives on dyeing wool in an acid bath a magnificent rose shade very fast to light and fulling. Treatment of the same starting dye in the absence of free mineral acid by the usual methods gives only a bluish red shade.

Example II

A paste containing 46.5 kg of the azo dye obtained by combining the diazo compound of 5-nitro-2-aminophenol with 2-amino-naphthalene-5.7-disulphonic acid is heated in a sealed autoclave with stirring at 125° C. for 6 hours with 400 litres of water and 100 litres of a solution of chromium sulphate containing 35.3 kg of that salt, of the above formula, and 2.500 kg of sulphuric acid 66° Bé.

On cooling, the chrome compound separates out in the form of small bronzed crystals. The dye obtained is easily soluble in water, even cold. It colors wool in an acid bath a very pure bluish green, while the chromium compound obtained in the absence of mineral acid dyes green with a yellowish tint.

Example III 44 kg of the azo dye obtained by combining the nitrated diazo compound of 1-amino-2-hydroxy-naphthalene-4-sulphonic acid and β-naphthol in the form of a paste weighing 115 kg are mixed into 400 litres of water to which is then added 150 litres of a solution of chromium sulphate containing 53 kg of that salt, of the above formula, and 3.75 kg of sulphuric acid of 66° Bé., then heated in a sealed autoclave for 4 hours at 135° C.

After cooling, the chromium compound is filtered and is washed on the filter with cold water. In the dry state it exhibits the form of a black crystalline powder insoluble in water as it is, but easily soluble in water as a sodium salt.

The dye colors wool black in an acid bath; in a light shade there is obtained a bright bluish gray.

Example IV

A quantity of acid paste comprising 47.5 kg of the azo dye obtained from the diazo compound of 1-amino-2-hydroxy-naphthalene-4-sulphonic and 1-hydroxy-naphthalene-β-sulphonic acid is mixed into 200 litres of water to which is added 100 litres of a solution of chromium sulphate containing 35.3 of that salt, of the same formula as above; the mixture being heated for 5 hours to boiling point in an apparatus provided with a reflux condenser.

At the end of this time of heating the transformation is completed. The product is left 24 hours for cooling. The chromium compound of the dye separates out in the form of small crystals with a bronze sheen.

The dye is then filtered, washed with a little salt water at 8° Bé. containing 1% of hydrochloric acid.

The dried and ground dye takes the form of a crystalline powder with bronzed reflection sparingly soluble in boiling water, but easily soluble as a sodium salt.

Dyed in the usual manner on wool in the presence of sulphuric acid, it gives very pure greenish blue shades.

*Example V*

52 kgs. of the azo dye resulting from the combination of 2 diazo - 1 - hydroxybenzene - 4 - sulphonic acid with 1.8 dihydroxy-naphthalene-3.6-disulphonic acid are dissolved in 300 litres of water; thereto is added 100 litres of chromium sulphate solution of the character given in the preceding examples and it is heated for 3 hours in an autoclave at 130–135° C. After this lapse of time the reaction mass is filtered or allowed to settle, then evaporated in an enamelled double vessel.

The dye exhibits the form of a bronze powder, very soluble in water. It colors wool in sulphuric acid bath a navy blue shade with reddish reflection.

What I claim is:—

1. The manufacture of dyes containing chromium by treating ortho-hydroxyazo dyes with chromium sulphate and sulphuric acid.

2. The manufacture of dyes containing chromium by treating ortho-hydroxyazo dyes with chromium sulphate and sulphuric acid under heat and pressure.

3. The manufacture of dyes containing chromium by treating ortho-hydroxyazo dyes with chromium sulphate, water and sulphuric acid.

4. The manufacture of dyes containing chromium by treating an ortho-hydroxyazo dye with chromium sulphate, sulphuric acid and water under heat and pressure.

5. The manufacture of dyes containing chromium by treating an ortho-hydroxyazo dye with chromium sulphate of the formula $Cr_2(SO_4)_3$, $18H_2O$ in the presence of sulphuric acid under heat and pressure.

6. The manufacture of dyes containing chromium by heating under pressure an ortho-hydroxyazo dye of the naphthalene sulphonic acid series with chromium sulphate and sulphuric acid.

7. The manufacture of dyes containing chromium by heating under pressure an ortho-hydroxyazo dye of the naphthalene sulphonic acid series with chromium sulphate, water and sulphuric acid.

8. The manufacture of dyes containing chromium by treating an ortho-hydroxyazo dye of the naphthalene sulphonic acid series with chromium sulphate in the presence of sulphuric acid.

9. The manufacture of dyes containing chromium by treating an ortho-hydroxyazo dye of the naphthalene sulphonic acid series with chromium sulphate in a sealed container under the action of heat and pressure in the presence of sulphuric acid.

10. The manufacture of dyes containing chromium by treating an ortho-hydroxyazo dye of the naphthalene sulphonic acid series with chromium sulphate and water under heat and pressure in a sealed vessel in the presence of sulphuric acid.

11. The manufacture of dyes containing chromium by treating an ortho-hydroxyazo dye of the naphthalene sulphonic acid series with chromium sulphate in a sealed vessel and at a temperature approximately within the range of from 120 to 135° C., and then cooling the mixture and separating the new dye compound therefrom.

12. The manufacture of dyes containing chromium which consists in heating under pressure an ortho-hydroxyazo dye of the naphthalene sulphonic acid series with chromium sulphate.

13. The method of manufacture of dyes containing chromium, which consists in subjecting an ortho-hydroxyazo dye to the action of chromium sulphate under heat and pressure.

14. The method of manufacture of dyes containing chromium, which consists in subjecting an ortho-hydroxyazo dye to the action of chromium sulphate of the formula $Cr_2(SO_4)_3.18H_2O$ under heat and pressure.

15. The manufacture of dyes containing chromium by treating an ortho-hydroxyazo dye of the naphthalene sulphonic acid series with chromium sulphate in a sealed vessel and at a temperature approximately within the range of from 120 to 130° C.

ERNEST ALBERT SACK.